Patented Nov. 8, 1949

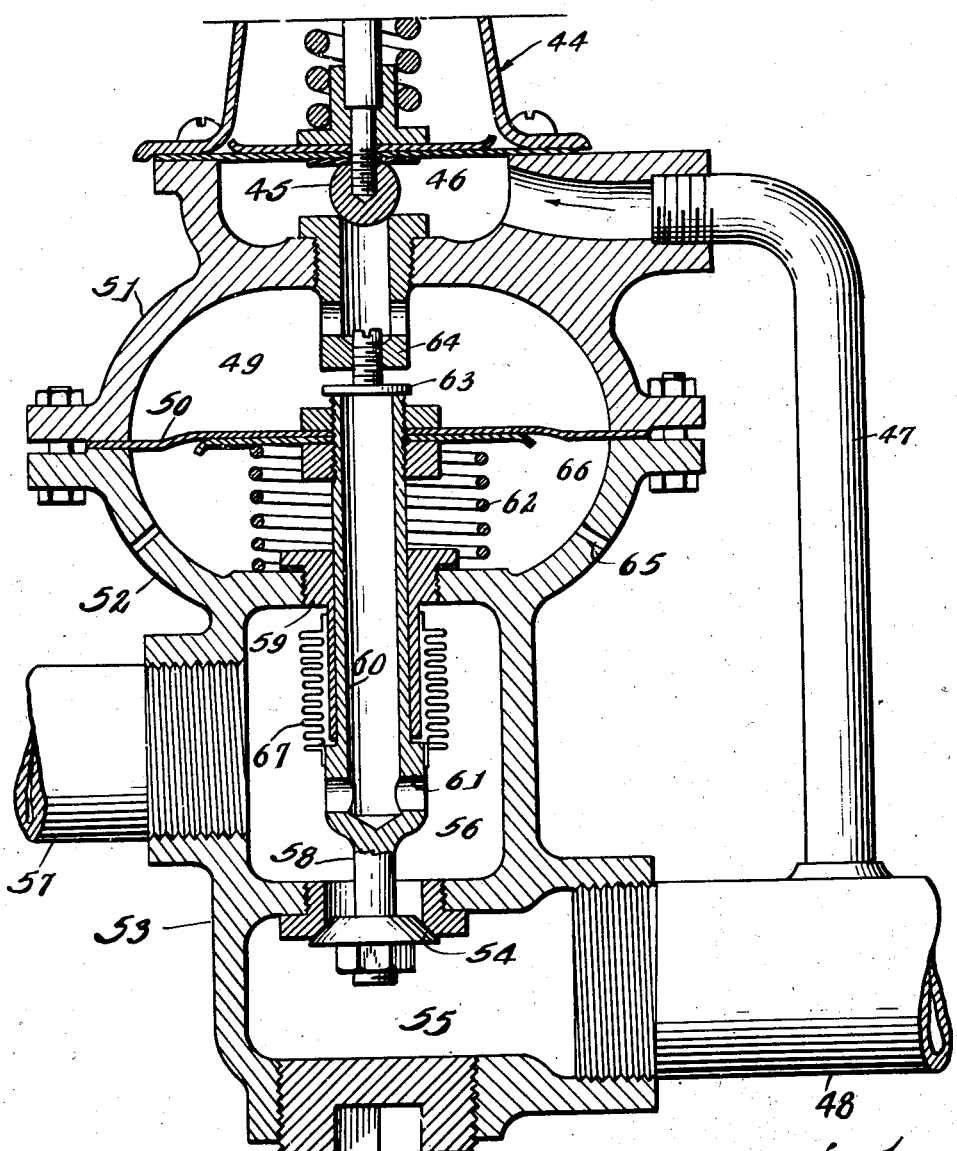

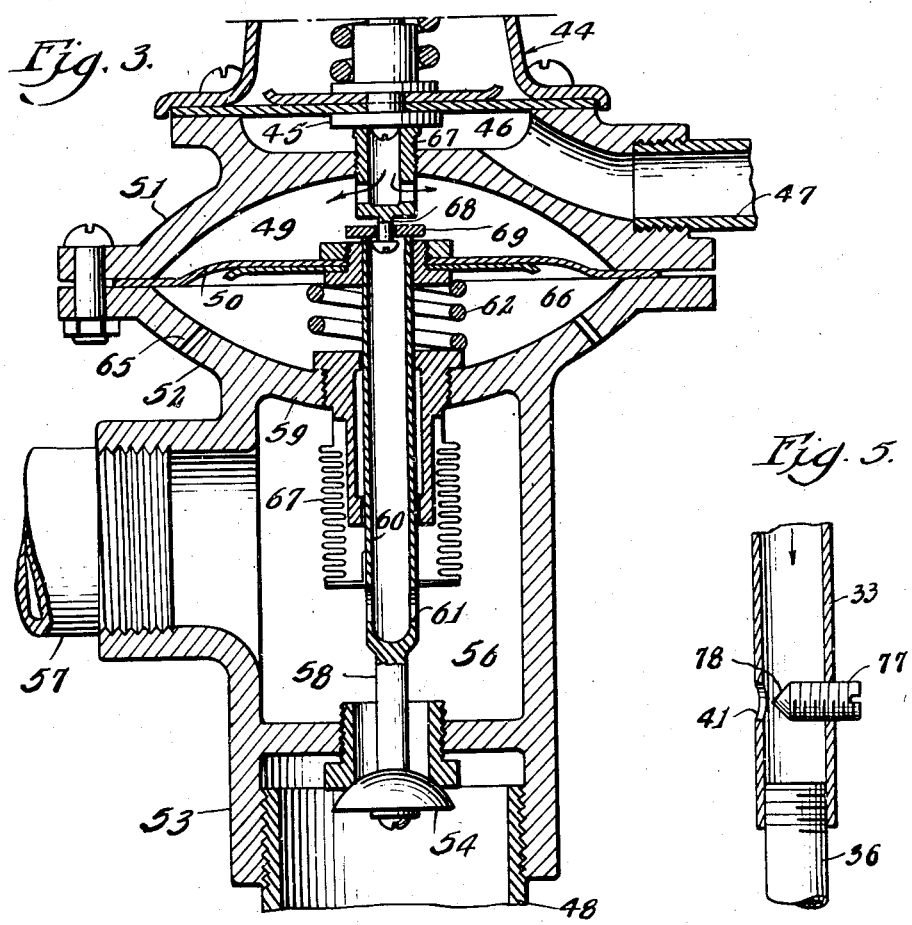
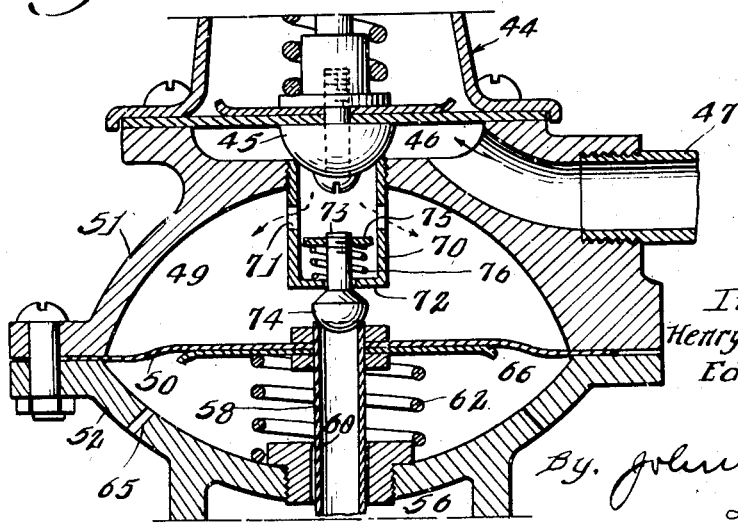

2,487,418

UNITED STATES PATENT OFFICE 2,487,418

PRESSURE RELIEF VALVE

Henry P. Birkemeier, Chicago, and Edwin B. Tidd, Mount Prospect, Ill., assignors to Bell & Gossett Company, Morton Grove, Ill., a corporation of Illinois Application September 15, 1945, Serial No. 616,561

11 Claims. (Cl. 137—53)

Our invention relates to pressure operated, relief valves for boilers and more particularly to those of the pilot operated type in which provision is made for a valve characterized by large capacity and ability to open quickly.

While capable of application to boilers generally, our invention is more particularly intended for use with hot water boilers and will be so described. Pilot operated, pressure relief valves for hot water boilers are well known, but they are so designed that parts of the structure are extraneous of the main body of the valve, thus producing a cumbersome arrangement which is space consuming in installations and one that requires additional fittings with attendant danger of leaky joints.

It is therefore one object of our invention to devise a relief valve of the character indicated in which the essential operating parts are contained within the body of the valve structure, thus providing a valve which is compact and capable of being easily packed, shipped and installed as a unit.

A further object is to provide a valve as above in which the principal force for opening the main relief valve is secured by discharging water at boiler pressure into a chamber having a materially lower pressure whereby the sudden expansion of the water creates a quick acting pressure that is effective against a movable wall of the chamber, the wall being connected to the main valve.

A further object is to provide in such a pilot operated, relief valve throttling arrangements of varying designs intended to delay the discharge from the low pressure chamber of water and steam, if any, to thereby insure that the main relieving valve will remain open for the maximum time.

These and further objects of our invention will be set forth in the following specification, reference being had to the accompanying drawings, and the novel means by which said objects are effectuated will be definitely pointed out in the claims.

In the drawings:

Figs. 1, 2, 3 and 4 are sectional elevations showing various forms of our improved valve.

Fig. 5 is a throttling detail that may be used with any of the various forms.

Figure 1:
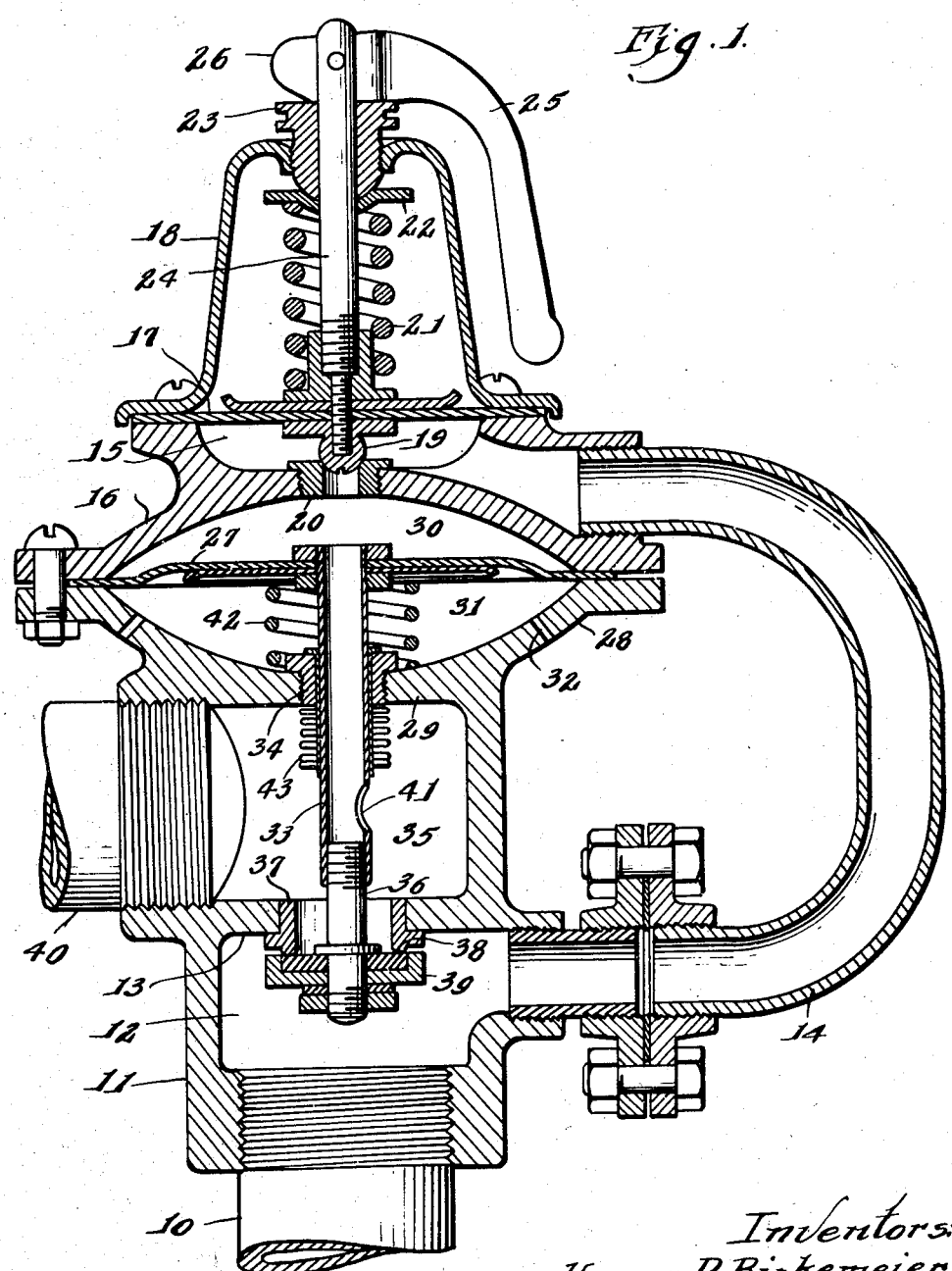

Referring to Fig. 1 of the drawings, the numeral 10 designates a pipe whose delivery end is threaded in a valve body 11, it being understood that the other end of the pipe would be connected to a boiler (not shown), or to a pipe leading to or from the boiler in such a manner that the interior of the pipe 10 is always subjected to boiler pressure. Connections of this type between boilers and pressure operated, relief valves are well known in the art.

The pipe 10 communicates with a chamber 12 formed in the valve body 11 beneath a dividing wall 13 and the chamber connects by way of a bypass 14 with a chamber 15 partly formed by recessing the top surface of an inverted dished, cover plate 16 which is secured to the upper end of the body in the manner presently described. A diaphragm 17, constituting one wall of the chamber 15, is clamped between the plate 16 and a frusto-conical casing 18, and from the under side of the diaphragm depends a pilot valve 19 that normally engages a valve seat provided on the upper end of a bushing 20 threaded through the plate. Since the under side of the diaphragm is always subjected to boiler pressure, it is necessary to load the diaphragm as by means of a helical spring 21 interposed between the diaphragm and a spring cap 22 that is engaged by an adjustable nut 23 threaded through the upper end of the casing 18. In such constructions, the spring 21 is considered to so load the diaphragm 17 that the valve 19 will be raised or opened when the boiler pressure reaches thirty pounds gage, although actually the valve begins to open at about twenty-eight pounds. This opening pressure is characteristic of a domestic, hot water heating system and is not to be regarded as limiting in scope, since this pressure may be varied for other installations. Manual opening of the valve 19 is accomplished in the usual manner by means of a stem 24 secured at its lower end to the diaphragm 17 and extending slidably through the nut 23 for pivotal attachment at its upper end to a release handle 25. This handle includes a cam nose 26 which, when the handle is swung upwardly, engages the upper end of the nut 23 to raise the stem 24.

A diaphragm 27 is clamped between the cover plate 16 and an annular, upwardly divergent wall 28 which forms part of the top wall 29 of the body 11. A chamber 30, defined by the plate 16 and diaphragm 27, communicates through the passage in the bushing 20 with the chamber 15 when the valve 19 is opened, while a chamber 31, defined by the diaphragm and the walls 28 and 29 communicates with the atmosphere through ports 32, thus facilitating the downward flexing of the diaphragm as presently described.

The upper end of a tube 33 is secured to the diaphragm 27 so as to place its interior in communication with the chamber 30 and extends slidably downward through a bushing 34 threaded through the wall 29 and across the major portion of a chamber 35 formed by the walls 13 and 29 and the side walls of the body. The lower end of the tube 33 is closed by the upper end of a stem 36 which projects downwardly through a bushing 37 mounted in the wall 13 and whose lower end is formed as a valve seat 38 that is engaged by a valve 39 secured to the lower end of the stem 36, this valve constituting the main relief element of the apparatus. The internal diameter of the bushing 37 is sufficiently larger than the diameter of the stem 36 to insure ample flow capacity between the chambers 12 and 35 and liquid passing to the latter chamber flows to a drain through a pipe 40, one end of which is connected to the valve body. The tube 33 communicates through an orifice 41 in its wall with the chamber 35 and a spring 42 interposed between the wall 29 and the diaphragm 27 tends to maintain the valve 39 closed. The primary function of the spring 42 is to hold the valve 39 closed while the associated heating system or boiler is initially filled with water and does not interpose any substantial resistance to the downward flexing of the diaphragm 27. When the system is operating normally, boiler pressure acts directly to maintain the closing of the valve 39. Leakage along the exterior of the tube 33 is prevented by a bellows seal 43 which encircles and has its lower end secured to the tube and its upper end attached to the bushing 34.

During operation, when the boiler pressure exceeds the pressure setting of the pilot valve 19, the latter opens and discharges hot water at boiler pressure into the chamber 30 which is substantially at atmospheric pressure by reason of its connection through the tube 33 with the drain pipe 40. The sudden expansion of the hot water, which due to the reduction in pressure may be accompanied by a flashing of all or a portion of the water into steam, provides a quick acting pressure that is effective over the diaphragm 27 whose area is several times larger than that of the valve 39. The valve 39 is accordingly opened quickly to discharge a substantial amount of hot water from the boiler. The pressure in the chamber 30 is constantly relieved through the tube 33 and orifice 41 and the latter may be sized to any desired area in order to secure a selected throttling on the release of the pressure. A suggested throttling control is shown in Fig. 5 wherein an adjusting screw 77 is threaded in the wall of the tube 33 and is provided within the tube with a pointed end 78 operably related to the orifice 41. By this means, it is possible to regulate the period of opening of the valve 39. When the pressure is relieved in the chamber 30, boiler pressure again closes the valve 39 and the valve 19 closes when the loading of the spring 21 exceeds the boiler presser.

In the modification shown in Fig. 2, the pilot operated, relief valve designated generally by the numeral 44 is provided as before with a valve head 45 depending from the diaphragm member of the pilot valve and controlling communication between a chamber 46, that is always subjected to boiler pressure through a bypass 47 and a pipe 48 connected to a boiler (not shown), and a chamber 49 included between a diaphragm 50 and a cover plate 51 whose recessed top constitutes part of the chamber 45. The diaphragm is clamped between the plate 51 and the dished top wall 52 of a valve body 53.

As in the Fig. 1 modification, the diaphragm 50 constitutes the actuating member for a main relief valve 54 which controls the discharge from a chamber 55, that always communicates with the pipe 48, into a chamber 56 that communicates with a drain pipe 57 attached to the valve body 53. The valve 54 is secured to the lower end of a stem 58 that extends upwardly through the chamber 56 and slidably through a bushing 59 secured in the wall 52. The upper end of the stem is attached to the diaphragm 50 and an axial passage 60 extending from this upper end to a point within the chamber where it terminates in apertures 61 provides a relieving path between the chambers 49 and 56 under certain operating conditions as presently noted.

When the valve 54 is not relieving, it is held closed by boiler pressure, assisted by a spring 62 disposed between the diaphragm 50 and the wall 52, thus maintaining the diaphragm in the position shown in Fig. 2 wherein the upper end of the stem engages a disk valve 63 which closes the passage 60. The valve 63 is adjustably mounted in the lower end of a bushing 64 mounted in the cover plate and whose upper end includes a valve seat normally contacted by the valve head 45. As in Fig. 1, the wall 52 is ported as at 65 so that the chamber 66 beneath the diaphragm 50 may be easily flexed downwardly, and the major purpose of the spring 62 is to hold the valve 54 closed during initial filling of the connected system. Also leakage along the exterior of the stem 58 is prevented by an encircling bellows seal 67 whose ends are respectively attached to the stem and the bushing 59.

The operation of this modification is generally similar to that illustrated in Fig. 1, except that when the pilot valve 44 is opened by boiler pressure, the hot water flows into the low pressure chamber 49 whose outlet through the stem 58 is at the moment closed by the disk valve 63. Hence, the sudden expansion of the water with possible flashing into steam is momentarily confined, resulting in a slightly quicker, downward flexing of the diaphragm 50 and opening of the main relief valve 54. As the diaphragm flexes, the annular opening between the valve 63 and the upper end of the stem 58 provides a throttling control on the relieving of the pressure and water in the chamber 49 to thereby secure the maximum effect of this pressure on the diaphragm. When the pilot valve 44 closes and the diaphragm 50 and valve 54 return to the positions shown in Fig. 2, the pressure in the chamber 49 is substantially that of the atmosphere and is always materially less than that of the connected boiler so that the valve is conditioned for the next relieving operation.

The modification shown in Fig. 3 differs from that illustrated in Fig. 2 only in the relieving control on the hot water discharged by the pilot valve 44. Corresponding parts are numbered alike in these figures of the drawings. The valve head 45 of the pilot valve normally engages with the upper end of a bushing 67, corresponding to the bushing 64, whose interior provides communication between the chambers 46 and 49 when the pilot valve opens. The lower end of the bushing 67 is reduced to form a headed pin 68 in coaxial relation to the stem 58 and slidably mounted on the pin is a disk valve 69 which, when the parts are in the positions shown, closes the upper end of the passage 60 with the valve 69 positioned intermediate of the length of the pin.

When the pilot valve 44 opens, the action is similar to that of the valve shown in Fig. 2, except that the valve 69 maintains the closing of the passage 60 for an appreciable time as the diaphragm 50 flexes downwardly, due to its capacity for movement along the pin 68. Hence, the pressure in the chamber 49 is confined for a longer period with a consequent longer opening of the valve 54. As the diaphragm flexes beyond the point where the valve 69 is stopped by the headed end of the pin 68, the passage 60 is uncovered to throttlingly relieve the pressure in the chamber 49. After the pilot valve closes, the valve 54 is then closed by boiler pressure and the parts resume the positions shown.

In Fig. 4 which shows a modification of the arrangement illustrated in Fig. 3, corresponding parts are numbered as in Fig. 3. A cup 70, whose upper and open end is engaged by the valve head 45 of the pilot valve 44 during non-relieving periods of the boiler, provides communication between the chambers 46 and 49 when the pilot valve opens through apertures 71 formed in the side wall of the cup. The lower end of the cup within the chamber 49 is closed by a wall 72 and slidably mounted through this wall is a stem 73 whose lower end beneath the wall 72 is provided with a valve head 74 which normally closes the upper end of the passage 60. The upper end of the stem 73 carries a washer 75 and freely interposed between the washer and the wall 72 in encircling relation to the stem is a helical spring 76, the spring being so arranged that the valve head 74 rests freely on the upper end of the stem 58 when the parts are in the positions shown.

When the pilot valve 44 opens, pressure is held for a short period in the chamber 49, because this pressure acts upon the upper surface of the washer 75 and on the valve head 74 and thus tends to maintain the closing relation of the head 74 to the passage 60 as the diaphragm flexes downwardly. This downward movement of the head 74 persists until the compression of the spring 76, in conjunction with the pressure acting upwardly on the under side of the washer 75, balances the pressure tending to move the head downwardly. Thereafter, further downward movement of the diaphragm uncovers the passage 60 and the pressure in the chamber is throttlingly relieved. Excepting for the difference in construction of the means for maintaining and relieving pressure in the chamber 49, the valves in Figs. 3 and 4 operate identically.

Each of the modifications is characterized by compactness and clean exterior design which are important attributes from the standpoint of manufacture, packing and shipping, as well as valuable considerations where space for installation is limited. Moreover, since the actuating pressure for the main relief valve is applied against a diaphragm whose area is large in relation to this valve, and, further, since the opening movement of this valve is substantially unrestrained by a spring, its opening is quick and ample to discharge an amount of hot water that adequately relieves the boiler.

We claim:

1. A pressure relief valve comprising first valve means responsive to the controlled pressure, a second valve means constituting the primary relief for the pressure, means actuated by the pressure released by the first valve means for opening the second valve means and including drain means for relieving the actuating pressure, and means closing the drain means in the retracted position of the actuating means, the closing means being separated from the drain means by pressure movement of the actuating means.

2. A pressure relief valve comprising first valve means responsive to the controlled pressure, a second valve means constituting the primary relief for the pressure, means actuated by the pressure released by the first valve means for opening the second valve means and including drain means for relieving the actuating pressure, and movable means normally closing the drain means and maintaining said closure until after a predetermined movement of the second valve means in an opening direction.

3. A pressure relief valve comprising first valve means responsive to the controlled pressure, a second valve means constituting the primary relief for the pressure, means actuated by the pressure released by the first valve means for opening the second valve means and including drain means for relieving the actuating pressure, and movable means normally closing the drain means and responsive to the pressure released by the first valve means to maintain said closing until after a predetermined movement of the second valve means in an opening direction.

4. A pressure relief valve comprising a chamber having a movable member forming one wall thereof, a valve connected to the member and constituting the primary relief for the controlled pressure, a pilot relief valve responsive to the pressure for controlling the admission of such pressure to the chamber to actuate the member and open the primary valve, the primary valve connection to the member including drain means for relieving the chamber pressure, and means closing the drain means in the retracted position of the movable member, the closing means being separated from the drain means by pressure movement of the member.

5. A pressure relief valve comprising a chamber having a movable member forming one wall thereof, a valve connected to the member and constituting the primary relief for the controlled pressure, a pilot relief valve responsive to the pressure for controlling the admission of such pressure to the chamber to actuate the member and open the primary valve, the primary valve connection to the member including a drain for relieving the pressure in the chamber, and movable means normally closing the drain and maintaining said closure until after a predetermined movement of the primary valve in an opening direction.

6. A pressure relief valve comprising a chamber having a movable member forming one wall thereof, a valve connected to the member and constituting the primary relief for the controlled pressure, a pilot relief valve responsive to the pressure for controlling the admission of such pressure to the chamber to actuate the member and open the primary valve, the primary valve connection to the member including a drain for relieving the pressure in the chamber, and movable means normally closing the drain and responsive to the pressure released by the pilot valve to maintain said closing until after a predetermined movement of the primary valve in an opening direction.

7. In a pilot operated relief valve, the combination of a chamber having a diaphragm forming one wall thereof, a pilot relief valve responsive to the controlled pressure for controlling the admission of such pressure to the chamber to flex the diaphragm, a valve constituting the primary relief for the pressure and having a stem connection to the diaphragm for opening thereby, the stem including a passage for connecting the chamber with a drain, and means closing the passage in the retracted position of the diaphragm, the closing means being separated from the passage by pressure movement of the diaphragm.

8. In a pilot operated relief valve, the combination of a chamber having a diaphragm forming one wall thereof, a pilot relief valve responsive to the controlled pressure for controlling the admission of such pressure to the chamber to flex the diaphragm, a valve constituting the primary relief for the pressure and having a stem connection to the diaphragm for opening thereby, the stem including a passage for connecting the chamber with a drain to relieve the pressure in the chamber, and movable means normally closing the passage and maintaining said closure until after a predetermined movement of the diaphragm in an opening direction of the primary valve.

9. In a pilot operated relief valve, the combination of a chamber having a diaphragm forming one wall thereof, a pilot relief valve responsive to the controlled pressure for controlling the admission of such pressure to the chamber to flex the diaphragm, a valve constituting the primary relief for the pressure and having a stem connection to the diaphragm for opening thereby, the stem including a passage for connecting the chamber with a drain to relieve the pressure in the chamber, and movable means normally closing the passage and responsive to the pressure released by the pilot valve to maintain said closing until after a predetermined movement of the primary valve in an opening direction.

10. A pressure relief valve comprising first valve means responsive to the controlled pressure, a second valve means constituting the primary relief for the pressure, means actuated by the pressure released by the first valve means for opening the second valve means and including a stem having a drain passage for relieving the actuating pressure, and a valve disk operably related to the inlet of the passage and conditioned for limited movement, the disk normally closing the inlet and maintaining said closure until after a predetermined movement of the second valve means in an opening direction.

11. A pressure relief valve comprising first valve means responsive to the controlled pressure, a second valve means constituting the primary relief for the pressure, means actuated by the pressure released by the first valve means for opening the second valve means and including a stem having a drain passage for relieving the actuating pressure, a valve member normally closing the inlet of the passage and maintaining said closure until after a predetermined movement of the second valve means in an opening direction, and spring means acting against the valve member in a direction opposite to the opening direction of the second valve means.

HENRY P. BIRKEMEIER.
EDWIN B. TIDD.

REFERENCES CITED

The following references are of record in the file of this patent:

UNITED STATES PATENTS

| Number | Name | Date |
|---|---|---|
| 738,161 | Christensen | Sept. 8, 1903 |
| 1,612,567 | Browne | Dec. 28, 1926 |
| 1,664,493 | Smith | Apr. 3, 1928 |

FOREIGN PATENTS

| Number | Country | Date |
|---|---|---|
| 392,396 | Great Britain | May 18, 1933 |